United States Patent
Dalsgaard et al.

(10) Patent No.: US 11,668,283 B2
(45) Date of Patent: Jun. 6, 2023

(54) WIND TURBINE METHOD FOR DETECTION AND CONTROL OF WHIRLING OSCILLATIONS

(71) Applicant: VESTAS WIND SYSTEMS A/S, Aarhus (DK)

(72) Inventors: Søren Dalsgaard, Hadsten (DK); Julio Xavier Vianna Neto, Aarhus (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 173 days.

(21) Appl. No.: 17/055,912

(22) PCT Filed: May 13, 2019

(86) PCT No.: PCT/DK2019/050147
§ 371 (c)(1),
(2) Date: Nov. 16, 2020

(87) PCT Pub. No.: WO2019/219138
PCT Pub. Date: Nov. 21, 2019

(65) Prior Publication Data
US 2021/0207583 A1    Jul. 8, 2021

(30) Foreign Application Priority Data
May 16, 2018 (DK) .......................... PA 2018 70298

(51) Int. Cl.
*F03D 7/02* (2006.01)
*F03D 17/00* (2016.01)

(52) U.S. Cl.
CPC .......... *F03D 7/0296* (2013.01); *F03D 17/00* (2016.05); *F05B 2240/21* (2013.01); *F05B 2270/326* (2013.01)

(58) Field of Classification Search
None
See application file for complete search history.

(56) References Cited

U.S. PATENT DOCUMENTS

2012/0257967 A1* 10/2012 Egedal ................. F03D 7/0224
416/1

FOREIGN PATENT DOCUMENTS

EP         2317327 A1    5/2011
WO   2017092773 A1    6/2017
(Continued)

OTHER PUBLICATIONS

Lu et al (2015) Analysis and design of Coleman transform-based individual pitch controllers for wind-turbine load reduction. Wind Energy, 18 (8). 1451-1468 (Year: 2015).*

(Continued)

*Primary Examiner* — Juan G Flores
(74) *Attorney, Agent, or Firm* — Patterson + Sheridan, LLP

(57) ABSTRACT

A method for detecting and controlling whirling oscillations of the blades of a wind turbine is presented. The detection of the whirling oscillations is based on measurement signal indicative of blade oscillations, and a rotation transformation of the measurement signal from a measurement frame into at least one target frame based on the whirling oscillation frequency. The rotation-transformation comprises a backward or forward rotation transformation direction relative to a rotor rotation direction. The control is based on an oscillation component obtained from the rotation-transformed measurement signal where the oscillation component is indicative of the whirling oscillation in the backward and/or forward rotation direction.

14 Claims, 4 Drawing Sheets

(56) References Cited

FOREIGN PATENT DOCUMENTS

WO     2017174094 A1    10/2017
WO     2019219138 A1    11/2019

OTHER PUBLICATIONS

European Patent Office, Communication under Rule 71(3) EPC for Application 19 725 273.7-1007 dated Jan. 27, 2022.
PCT International Search Report for Application No. PCT/DK2019/050147 dated Feb. 8, 2019.
Jason Laks et al., "Multi-Blade Coordinate and direct techniques for asympotic distrubance rejection in wind turbines," Decision and Control (CDC), 2012 IEEE 51st Annual Conference, pp. 2557-2562.
PCT Written Opinion of the International Searching Authority for Application No. PCT/DK2019/050147 dated Feb. 8, 2019.
Danish and Patent Office First Process Report for Application No. PA 2018 70298 dated Nov. 12, 2018.
Q. Lu, R. Bowyer, B. Li. Jones, Analysis and design of Coleman transform-based individual pitch controllers for wind-turbine load reduction, ind Energy, vol. 18, No. 8, pp. 1451-1468, Wiley-Blackwell, DOI: https://doi.org/10.1002/we.1769.
Petersen, Jørgen Thirstrup et al., "Local Blade Whirl and Global Whirl Interaction", Risø-R-1067(EN), Risø National Laboratory, Roskilde, Denmark, Aug. 1998.

* cited by examiner

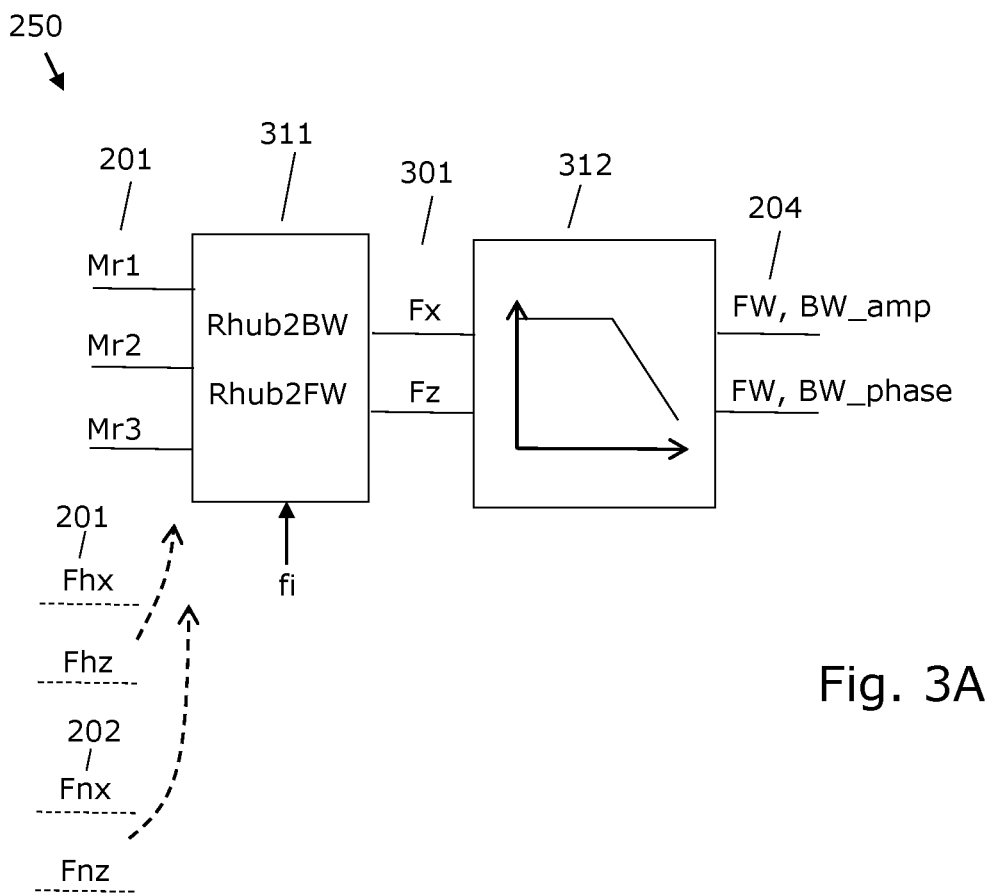
Fig. 3A
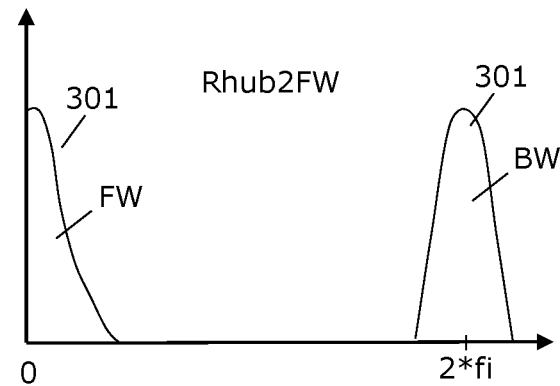
Fig. 3B
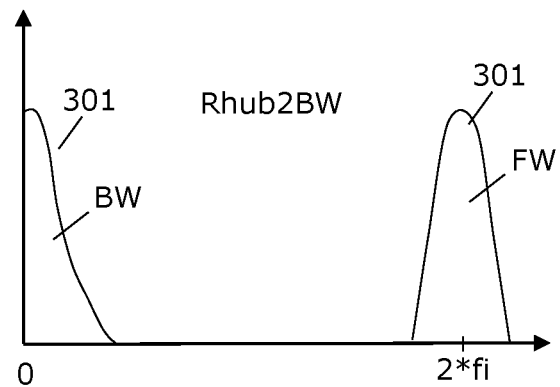

WIND TURBINE METHOD FOR DETECTION AND CONTROL OF WHIRLING OSCILLATIONS

FIELD OF THE INVENTION

The invention relates to detection of oscillations in wind turbines, particularly to detection of whirling oscillations in the blades of wind turbines and to control of wind turbines based on such oscillations.

BACKGROUND OF THE INVENTION

Blades of wind turbines may be excited to oscillate in whirling modes. Existing methods for detecting whirling modes may not be sufficient, e.g. fast enough for detecting an oscillation and subsequently invoking a control action for reducing the oscillation. It is known to detect oscillations by FFT methods. However, such methods are may be too slow in order to be able to start a control action before the oscillation increases to unacceptable amplitudes. Accordingly, there is a need for improving methods for detecting blade oscillations.

For different purposes like reduction on edgewise loads, productions costs of wind turbine blades and other wind turbine components it would beneficial to reduce the amount of material used for the manufactory of wind turbine blades. However, reducing the amount of material may cause a reduction of blade stiffness. Reduced blade stiffness may promote the generation of whirling oscillations of the blades. Thus, improved methods for detecting blade oscillations is also needed for in order to realise reductions in the amount of material used for blade manufactory.

SUMMARY OF THE INVENTION

It is an object of the invention to improve detection of blade oscillations in wind turbines. It is also an object of the invention to improve control methods of wind turbines, particularly to controlling methods which improve lifetime and/or production capabilities of wind turbines. It is also an object of the invention to enable blade manufactory of wind turbine blades with reduced material consumption.

In a first aspect of the invention there is provided a method for controlling a wind turbine comprising a rotor with two or more blades, the method comprises,
  obtaining a measurement signal indicative of a blade oscillation of at least one of the blades, where the measurement signal is obtained in a measurement frame of the wind turbine,
  rotation-transforming the measurement signal, or a derivative therefrom, from the measurement frame into at least one target frame based on a frequency of interest of the at least one blade to obtain a rotation-transformed signal, where the at least one target frame rotates with the frequency of interest relative to a rotation frequency of the rotor, and where the rotation-transformation comprises a backward or forward rotation transformation direction relative to a rotor rotation direction,
  based on the rotation-transformed signal, obtaining at least one blade oscillation component of the blade oscillation acting in the backward or forward rotation direction relative to the rotor rotation direction, and
  controlling the wind turbine based on the blade oscillation component.

The rotation transformation from the measurement frame to the target frame is based on the frequency of interest, e.g. an expected oscillation frequency of the blade. Accordingly, the frequency of interest is used for determining the angle at different times so that the measurements, e.g. blade forces, can be converted into the target frame which rotates with the same frequency as the blade oscillations. In the target frame, the transformed signal can be processed into a signal component which can be used for controlling the wind turbine.

Advantageously, the method is not based on computationally demanding FFT methods, but on rotation transformations and filtering so that the possible blade oscillations can be detected very fast.

Furthermore, the method enables detection of a particular rotation direction of the blade oscillation, in the forward or backward direction of the rotation, or possibly both directions.

The controlling of the the wind turbine based on the blade oscillation component may be an optional function since the at least one blade oscillation component may be useful in itself for other purposes than controlling the wind turbine, e.g. for accumulated blade-fatigue estimation.

The method may be used for different frequencies of interest so that blade oscillation components for different frequencies can be obtained.

According to an embodiment, the at least one blade oscillation component comprises a forward blade oscillation component of the blade oscillation acting in a forward direction of the rotor rotation. According to another embodiment the at least one blade oscillation component comprises a backward oscillation component of the blade oscillation acting in a backward direction of the rotor rotation. Advantageously, the method can be used to determine blade oscillation components for either backward or forwards direction. Clearly, the method can also be used to determine blade oscillation components for both backward or forwards directions. Dependent on current operational conditions of the wind turbine, the method can be used to detect the oscillation component for an oscillation direction which may be most relevant in view of the operational condition of the wind turbine. For example, if the rotation speed of the wind turbine has a certain value, there may be a risk that a backward whirling oscillation resonance may be excited by a 3P frequency of the rotor rotation. Accordingly, the method can be focused on detecting blade oscillation in the backward direction and at a frequency of interest which could be excited by the 3P frequency.

According to an embodiment, the method comprises filtering the rotation-transformed signal for obtaining the at least one blade oscillation component. Since the blade oscillation at the frequency of interest is transformed to a low frequency spectrum, the blade oscillation component may advantageously be obtained by simple filtering, e.g. low pass filtering.

According to an embodiment, the method comprises band-pass filtering the measurement signal based on the frequency of interest prior to the rotation transformation of the measurement signal. The measurement signal may initially be filtered based on the frequency of interest so that non-relevant or disturbing frequencies can be removed. The initial filtering may advantageously enable simpler filtering of the rotation-transformed signal.

According to an embodiment, the measurement frame is a rotor frame rotating with the rotor or the measurement frame is a non-rotating frame. Advantageously, the measurement signal may be obtained from sensors located in a rotating component of the wind turbine or from sensors located in a non-rotating component such as acceleration, load or strain sensors located in the nacelle.

According to an embodiment, the frequency of interest is a resonance frequency of the at least one blade. Since oscillations at blade resonance frequencies may be most critical since they may be excited into large amplitudes, the method may advantageously be used for monitoring amplitudes of oscillations at such resonance frequencies.

According to an embodiment, the method further comprises rotation-transforming the measurement signal from the measurement frame into a measurement signal in the non-rotating frame based on an angular position $\phi$ of the rotor. As a first step, the measurement signal obtained from sensors located in a rotating component may be rotation transformed to a non-rotating frame. Due to the transformation, the forward and backward oscillation components are transformed to different frequencies in the non-rotating frame.

According to an embodiment, the method further comprises band-pass filtering the measurement signal obtained in the non-rotating frame, or the measurement signal transformed to the non-rotating frame, based on a frequency of the blade oscillation frequency in the non-rotating frame determined based on the frequency of interest and the rotation frequency of the rotor. Since the forward and backward oscillation components are transformed to different frequencies in the non-rotating frame, the different forward and back oscillations can be extracted accordingly to their frequencies in the non-rotating frame.

According to an embodiment, the method further comprises rotation-transforming the band-pass filtered measurement signal in the non-rotating frame from the non-rotating frame to the rotor frame to obtain a signal of the blade oscillation at the frequency of interest. By rotation-transforming the band-pass filtered measurement signal back to the rotor frame, a signal for the backward oscillation and for the forward oscillation can be obtained. One or both of these signals are further transformed to the target frame rotating with the frequency of interest.

According to an embodiment, the controlling of the wind turbine comprises adjusting the rotation frequency of the rotor dependent on the blade oscillation component. Advantageously, since the blade oscillations may be excited due to the rotor rotation, detected blade oscillations may be reduced be reducing the rotor speed or possibly by increasing the rotor speed.

According to an embodiment, the controlling of the wind turbine is based on an amplitude and/or phase of the at least one blade oscillation component. Advantageously, by use of the phase, the pitch of the blades of the wind turbine may be controlled to counteract the blade oscillations.

A second aspect of the invention relates to a control system for controlling a wind turbine comprising a rotor with two or more blades, where the control system is arranged to perform the steps according to the method of the first aspect.

A third aspect of the invention relates to a computer program product comprising software code adapted to control a wind turbine when executed on a data processing system, the computer program product being adapted to perform the method of any of the first aspect.

A fourth aspect of the invention relates to a wind turbine comprising a rotor with two or more blades, where the wind turbine further comprises a control system according to the second aspect.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which FIG. 3A illustrates an alternative embodiment of the control system, FIG. 3B illustrates spectra of the rotation transformed signal in the target frame.

DESCRIPTION OF EMBODIMENTS

Figure 1A:
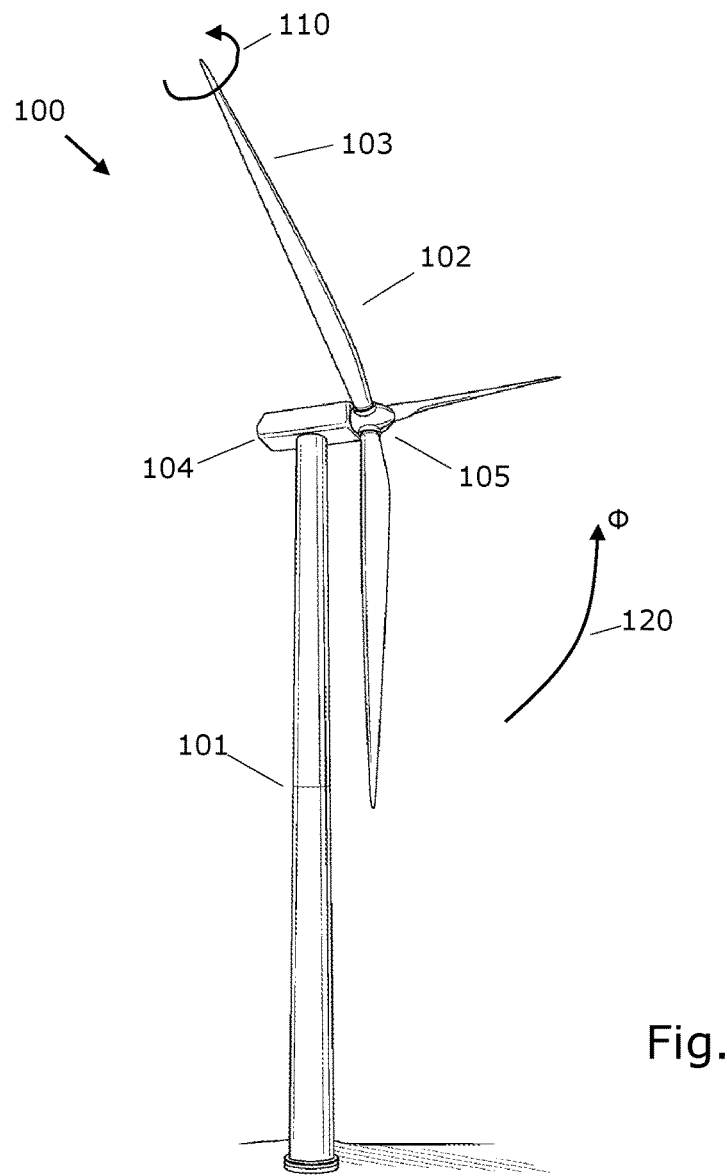
FIG. 1A illustrates a wind turbine.

FIG. 1A shows a wind turbine 100 (WTG) comprising a tower 101 and a rotor 102 with at least one rotor blade 103, such as three blades. The blades 103 are connected with the hub 105 which is arranged to rotate with the blades. The rotor is connected to a nacelle 104 which is mounted on top of the tower 101 and being adapted to drive a generator situated inside the nacelle via a drive train. The rotor 102 is rotatable by action of the wind. The wind induced rotational energy of the rotor blades 103 is transferred via a shaft to the generator. Thus, the wind turbine 100 is capable of converting kinetic energy of the wind into mechanical energy by means of the rotor blades and, subsequently, into electric power by means of the generator. The generator is connected with a power converter, which comprises a generator side converter and a grid side converter. The generator side converter converts the generator AC power into DC power and the grid side converter converts the DC power into an AC power for injection into the utility grid via output inductors of the wind turbine 100.

Figure 4:
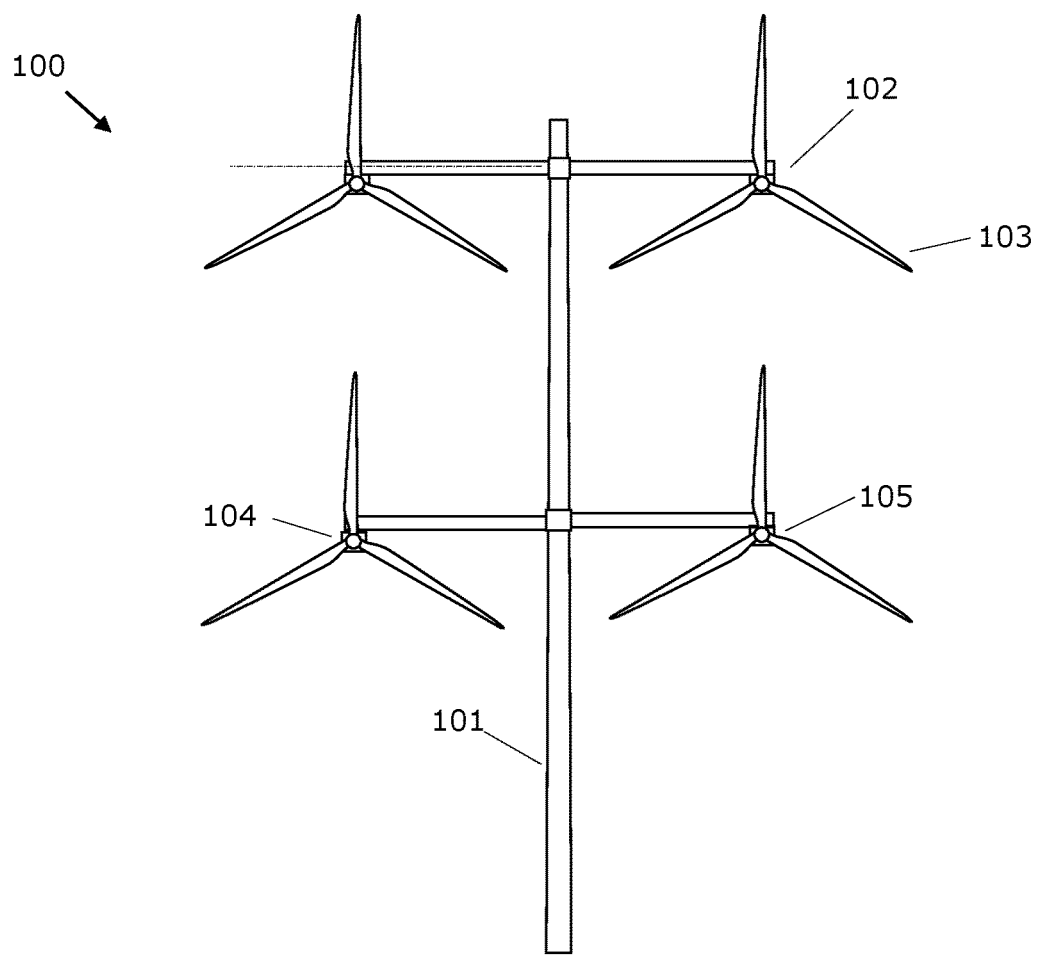
FIG. 4 shows wind turbines configured as multi-rotor wind turbines.
Figure 4:
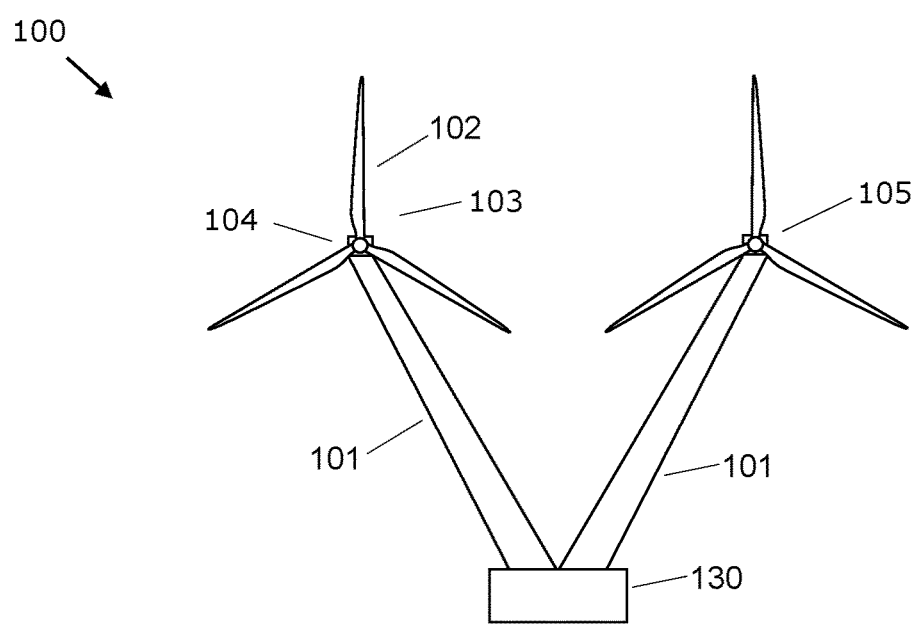

FIG. 4 shows alternative wind turbines 100 configured as multi-rotor wind turbines. Multi-rotor wind turbines comprise a plurality of nacelles 104. The nacelles 104 can be supported, as illustrated in the upper drawing, via a tower 101 and support arms extending outwardly from the tower 101 so that the nacelles are placed away from the tower and on opposite sides of the tower. Alternatively, as illustrated in the lower drawing, the nacelles 104 can be supported by angled towers 101 extending from a foundation 130, e.g. a ground or floating foundation, so that two or more nacelles 104 are sufficiently separated from each other at a given height. Embodiments of the present invention may be used with multi-rotor wind turbines or single-rotor wind turbines.

The blades may be excited to oscillate as indicated by oscillation 110. The oscillation may cause a linear motion, an elliptical motion of the blade tip, or other motion trajectories of the blade tip. Such oscillations of the blades, when observed collectively from a rotor perspective, are known as whirling oscillations. The whirling oscillations may be resonant or non-resonant oscillations.

The rotor 102 and hub 105 rotates in the hub direction 120. The angular position of the rotor 102 and hub 102 is given by the azimuth φ. Thus, thus the rotation frequency of the rotor and hub is f_hub=dφ/dt.

The whirling oscillation of a blade may be a forward whirling oscillation (FW), a backward whirling oscillation (BW), or the whirling oscillation may comprise both a forward whirling oscillation (FW) and a backward whirling oscillation (BW). The forward whirling oscillation FW acts in the forward direction of the rotor rotation direction 120, whereas the backward whirling oscillation BW acts in the backward direction of the rotor rotation direction 120.

The whirling oscillation may have more than one whirling frequency including one or more of first, second and higher order resonance frequencies and non-resonant frequencies. Resonant oscillations include flap-wise and edge-wise oscillations of the blades. Embodiments of the invention relate to detecting at least one frequency of interest fi of the whirling oscillations which may be any of the one or more referred whirling frequencies.

Figure 1B:
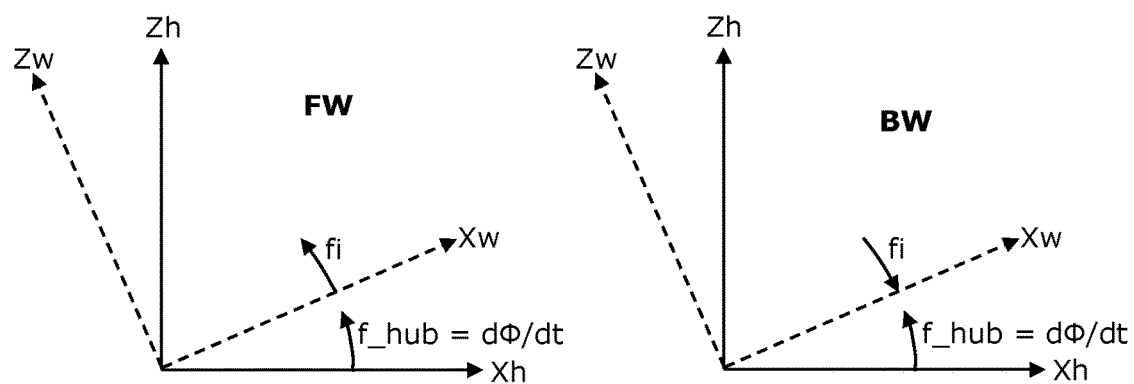
FIG. 1B illustrates a rotor frame and a coordinate system of the rotor, and a target frame and coordinate system of the blade oscillation.

FIG. 1B shows the coordinate system Xh,Zh of the hub 105 and rotor 102 which rotates with rotation frequency f_hub in the counter-clockwise direction. Alternatively, and commonly, the rotor rotates in the clockwise direction when the rotor is seen from the front.

The coordinate system Xw,Zw, in the left illustration, represents a forward whirling oscillation FW with oscillation frequency fi. Since the forward whirling oscillation FW rotates with the rotation direction of the hub, the forward whirling frequency relative to the ground or a non-rotating frame is given by fi+f_hub.

The coordinate system Xw,Zw, in the right illustration, represents a backward whirling oscillation BW with oscillation frequency fi. Since the backward whirling oscillation BW rotates in an opposite rotation direction of hub rotation, the backward whirling frequency relative to the ground or a non-rotating frame is given by fi−f_hub.

Examples of the rotation frequency f_hub of the hub 105 includes frequencies in the range of 0.2-1 Hz. Examples of the frequency of interest fi of blade whirling oscillations includes frequencies in the range from 0.5 to 3 Hz. However, other frequencies are also possible, e.g. dependent on dimensions, materials and design of the blades 103.

Figures 2A, 2B:
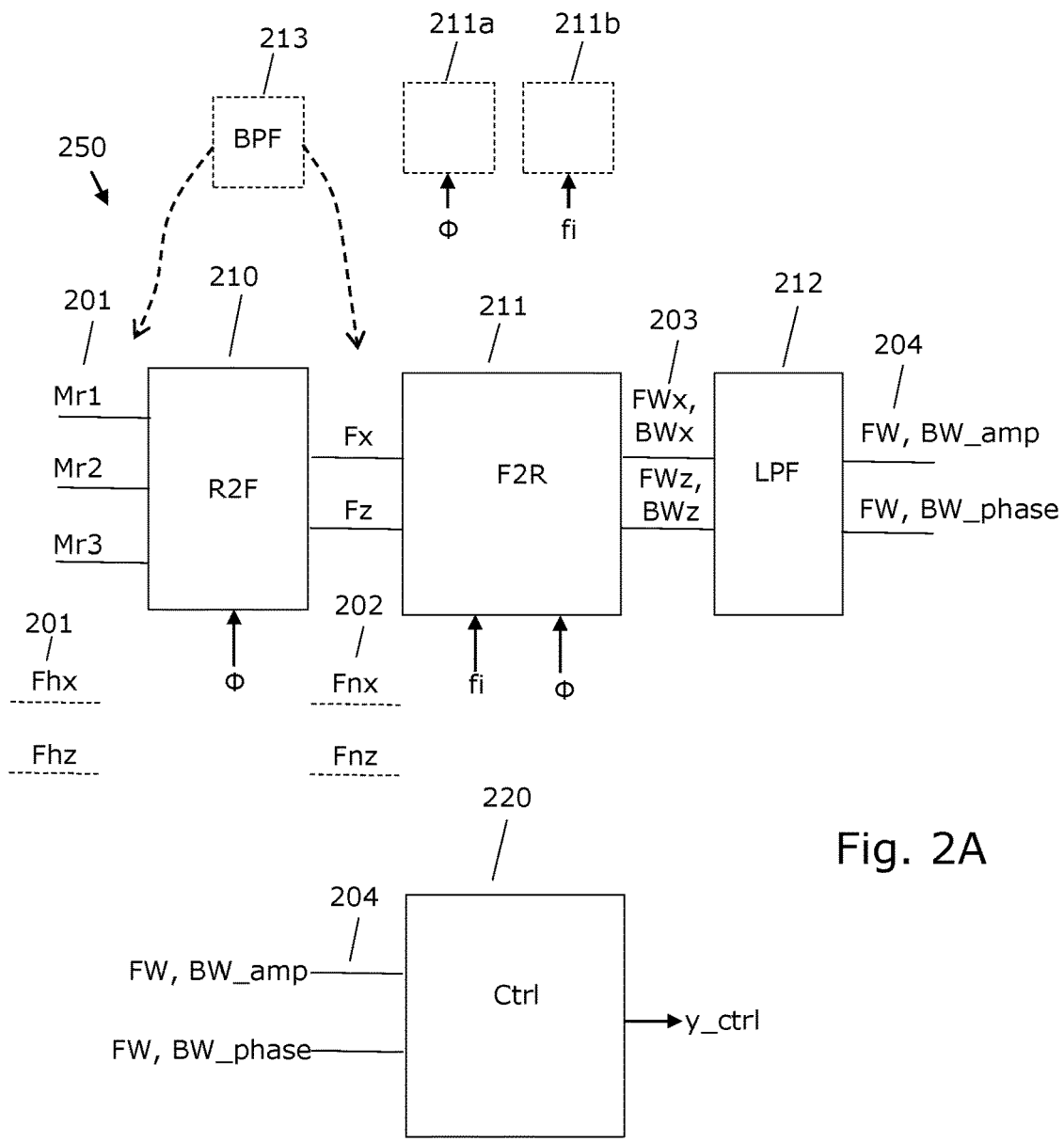
FIG. 2A illustrates a method for detecting forward and backward whirling oscillations and control system for detection oscillations and controlling the wind turbine.
FIG. 2B illustrates the frequency spectra of the backward and forward whirling oscillation signal at their respective frequencies in the non-rotating frame.

FIG. 2A illustrates a method for detecting forward and backward whirling oscillations 110 of the blades and for controlling the wind turbine based on forward and/or backward oscillation components 204 obtained from the detected oscillations 110, as well as a control system 250 for performing the detection and control.

The detection of whirling oscillations is based on a measurement signal 201 which may contain information of a blade oscillation of the blades 103, where the information is directly or indirectly related with the blade oscillations 110.

The measurement signal 201 may be obtained from various sensors located on rotating or non-rotating components of the wind turbine. The measurement signal 201 originates from a measurement frame which represents the actual rotating or non-rotating component of the wind turbine.

The measurement signal 201 may be obtained from blade sensors arranged to measure blade deflections, blades strain, blade accelerations or other blade characteristics of one or more individual blades. Such sensors, e.g. optical strain sensors, may be attached to the blades. The measurement signal may directly contain information about oscillation amplitudes, e.g. in the form of measured blade deflections, or indirectly in the form of measured blade accelerations. The measurement frame of the measurement signal 201 originating from such blade sensors is referred to as a rotor frame. The rotor frame rotates with the coordinate system Xh, Zh. The rotor frame rotates with the rotor 102 and hub 105. The blade sensors provide one or more signals Mr1-Mr3. For a 3-blade rotor 102 the measurement signal may be constituted by signals Mr1, Mr2, Mr3. The signals Mr1-Mr3 may be in the form of blade deflection signals, blade strain signals, blade moment signals or other blade signals Mr1-Mr3.

Alternatively or additionally, the measurement signal 201 may also be obtained from hub sensors arranged in the rotating hub 105. For example, the hub sensors may be acceleration sensors which provide information about blade accelerations and thereby blade oscillations. For example, the hub sensors may be arranged to provide signal components, e.g. force components or other hub signals Fhx, Fhz, along the coordinate axes Xh, Zh shown in FIG. 1B. The measurement frame of the measurement signal 201 originating from such hub sensors is referred to as the rotor frame.

As shown in FIG. 2A, the measurement signal 201 is either in the form of blade signals Mr1-Mr3 or in the form of hub signals Fhx, Fhz. Alternatively, the measurement signal 201 may constitute a combination of blade signals and hub signals.

The measurement signal 201 is rotation transformed by rotation transformation 210, R2F from the rotor frame to a non-rotating frame, i.e. a fixed frame. The measurement signal 201 in the non-rotating frame is denoted Fx, Fz.

The rotation transformation 210 is based on the azimuth angle φ of the rotor according to known rotation transformation methods such as the Colemann transformation, the DQ0 transformation or general rotation matrices.

The blade signals Mr1-Mr3 are not defined in the hub coordinate system Xh, Zh since the directions of the blades 103 are not coincident with the Xh, Zh axes. Thus, blade signals Mr1-Mr3 need to be projected, e.g. by use of a projection matrix P, onto the hub coordinate system Xh, Zh, before being rotation transformed by rotation transformation 210. A measurement signal in the form of blade hub signals Fhx, Fhz may already be coincident with the Xh, Zh axes.

Thus, the measurement signal 201 in the non-rotating frame, denoted Fx, Fz, can be found as $$[Fx,Fz]=R(\phi)P[Mr1,Mr2,Mr3], \text{ or}$$

$$[Fx,Fz]=R(\phi)[Fhx,Fhz],$$

where P is the projection matrix and R(φ) is the rotation transformation 210. The projection matrix is not explicitly illustrated in FIG. 2A, but could be illustrated as a rotation element located between the input 201 and the rotation transformation 210.

Backward and forward whirling oscillations at the frequency of interest fi will be transformed by the rotation transformation 210 to respective backward and forward frequencies f_BW and f_FW in the non-rotating frame with f_BW=fi−f_hub and f_FW=fi+f_hub.

As an alternative to obtaining the measurement signal 201 from the rotor frame, a measurement signal 202 may be obtained from sensors arranged in a non-rotating frame to provide information about blade accelerations and thereby blade whirling oscillations. For example, nacelle sensors located in the nacelle 104 provide nacelle signals Fnx, Fnz. The measurement frame of the measurement signal 202 originating from such nacelle sensors is referred to as the nacelle frame or non-rotating frame.

The measurement signal 202 obtained from the non-rotating frame is equivalent to the measurement signal 201 transformed to the non-rotating frame. Thus, the measurement signal 202 in the form of nacelle signals Fnx, Fnz is equivalent to the signal Fx, Fz obtained from measurement signal 201.

Whirling oscillations at the frequency of interest fi contained in the measurement signal 202 from the non-rotating frame, alternatively the rotation transformed signal Fx, Fz—will have frequencies f_BW=fi−f_hub and f_FW=fi+f_hub for respective backward and forward rotating whirling oscillation.

Since the measurement signal 201, 202 may be obtained in the rotor frame or in the non-rotating frame, the rotation transformation element 210 arrange for transforming the measurement signal 210 from the measurement frame into the non-rotating frame is optional, dependent on the origin of the measurement signal.

A rotation transformation 211, F2R is applied to the signal Fx, Fz obtained from the measurement signal 201 or to the measurement signal 202 in the form of nacelle signals Fnx, Fnz.

Thus, the measurement signal 202, or a derivative of the measurement signal 201 is rotation transformed by rotation transformation 211. The derivative of the of the measurement signal 201, is a signal derived from the measurement signal 201 e.g. by means of the projection-rotation transformation, $R(\phi)$ P, rotation transformation, $R(\phi)$, or other transformation or derivation.

Additionally or alternatively, any of the measurement signals 201, 202 may be subjected to other transformations or derivations such as a filtering before the rotation transformation 211 is applied.

The purpose of the rotation transformation 211 is to bring the measurement signal 201, 202 from the measurement frame, i.e. from any of the rotor frame or non-rotating frame, to a target frame which rotates with the frequency of interest fi relative to a rotation frequency f_hub of the rotor and with the rotation direction of the respective at least one blade oscillation component.

Since the nacelle signals Fnx, Fnz and the signals Fx, Fz obtained from measurement signal 201 may contain both a frequency component fi−f_hub for the backward whirling oscillation BW and a frequency component fi+f_hub for the for the forward whirling oscillation FW, the rotation transformation may comprise two rotation transformations, one or the backward whirling oscillation BW and one for the forward whirling oscillation FW. Thus, the rotation-transformation 211 comprises a backward or forward rotation direction of the target frame relative to a rotor rotation direction.

The rotation transformation 211 for the backward whirling oscillation BW is based on the frequency of interest fi and the rotor angle $\phi$ and may be described as follows:

$$[BWx, BWz] = R(\phi - \theta fi)[Fx, Fz]$$

Similarly, the rotation transformation 211 for the forward whirling oscillation BW may be described as follows:

$$[FWx, FWz] = R(\phi + \theta fi)[Fx, Fz]$$

Where $R(\phi - \theta fi)$ and $R(\phi + \theta fi)$ are the respective rotation transformations 211 and where $\theta fi$ is the angular position of the whirling oscillation. $\theta fi$ can be obtained by integrating the frequency of interest fi over time or simply as $\theta fi = fi \cdot t$.

Each of the rotation transformations $R(\phi - \theta fi)$ and $R(\phi + \theta fi)$ may equivalently be formulated as a product of two rotation transformations, i.e. as $R(\phi - \theta fi) = R1(\phi)R(-\theta fi)$ and $R(\phi + \theta fi) = R1(\phi)R(\theta fi)$, respectively.

Thus, as illustrated, the rotation transformation 211 may be configured as two consecutive rotation transformations 211a, 211b for rotation transforming from the non-rotating frame to the rotor frame based on azimuth $\phi$ and subsequently for rotation transforming from the rotor frame to the target frame based on the frequency of interest fi. The rotation transformations 211a, 211b may be applied in opposite order as well.

Accordingly, the rotation transformation 211 may be divided into two rotation transformations, so that the rotation transformation 211 includes a rotation transformation 211a of the measurement signal 201, 202, or the derivative therefrom, from the non-rotating frame to the rotor frame.

FIG. 2B, in the coordinate system to the left, illustrates the frequency spectra of the backward and forward whirling oscillation signal Fx, Fz obtained from one of the measurement signals 201, 202 at their respective frequencies fi−f_hub and fi+f_hub. FIG. 2B, in the coordinate system to the right, shows the rotation-transformed signal 203 generated by the transformation 211 of the measurement signal 202 or the derivative of any of the measurement signals 201, 202. The rotation transformation 211 may include a rotation transformation in the forward direction for transforming the forward whirling oscillation in the non-rotating frame to a zero- or low-frequency range in the target frame and/or a rotation transformation in the backward direction for transforming the backward whirling oscillation in the non-rotating frame to a zero- or low-frequency range in the target frame. As illustrated, the measurement signal 201, 202 is transformed by a forward rotation transformation into the signal 203. This signal 203 comprises the forward whirling signal FWx, FWz in a low frequency region and the backward whirling oscillation transformed into signal BWx, BWz at frequency 2*fi, i.e. to a frequency being twice the frequency of interest. In this way, a blade oscillation component 204 for the backward and/or forward oscillation may be obtained by filtering the rotation-transformed signal 203, e.g. by means of e.g. low pass or notch filtering. For convenience, the rotation-transformed signal 203 is only illustrated for the forward rotation transformation F2R_FW of the rotation transformation 211.

Accordingly, the rotation-transformation 211 transforms a frequency spectrum of the measurement signal 201, 202, or a derivative therefrom, to a frequency spectrum in the target frame comprising a zero frequency.

The rotation-transformed signal 203 may be processed in processing element 212, e.g. as mentioned by low pass filtering. Thus, the processing element 212 may be a low pass filter configured with a suitable cut-off frequency to extract the relevant DC component of the rotation-transformed signal 203.

The processing element 212 may be configured to determine the amplitude and/or the phase of the rotation-transformed signal 203. Thus, as illustrated, the processing element 212 may determine the blade oscillation component 204 so that it includes one or more of the quantities: the amplitude FW_amp of the signal FWx, FWz, the amplitude BW_amp of the signal FBx, FBz, the phase FW_phase of the signal FWx, FWz and the phase BW_phase of the signal FBx, FBz.

The optional processing of the filtered signal from the processing element 212 for determining the amplitude and/or the phase of the rotation-transformed signal 203 may be performed by a phase and amplitude element located after the processing element 212 (not illustrated). The signal FWx, FWz, i.e. the estimated forward whirling component, can be described as a vector with x and z coordinates. Thus, the phase and amplitude element may be configured to process this vector signal so as to determine the length and angle of this vector, or equivalently the amplitude and phase signals, FW_amp, FW_phase. The same applies for the estimated backward whirling component.

Clearly, the processing element 212 may be configured in other ways and the oscillation component 204 may be determined from the rotation-transformed signal 203 include other characteristics than amplitude and phase.

For example, instead of performing low pass filtering, the processing element 212 may be configured as a notch or band-stop filter to remove specific frequency spectra of the rotation transformed signal 203. Thus, the processing element 212 may generally be configured as a filter so that the oscillation component signal 204 mainly contains the frequency spectra of the BW and/or FW oscillations components.

The controller 220 is used for controlling the wind turbine 100 based on the blade oscillation component 204. The control signal y_ctrl may be determined according to known methods for controlling e.g. pitch angles or power production as explained below.

For example, oscillation component 204 may be used for determining a whirling oscillation situation which requires a control action in order to reduce the oscillations. Particularly the backward whirling oscillation mode BW may be excited by the 3P frequency oscillations caused by the interaction of a 3-blade rotor 102 and the tower 101. Accordingly, a resonant backward whirling oscillation may be excited when e.g. f_BW=fi−f_hub gets close to the 3P frequency. Even without a determination of the frequency of a whirling oscillation, e.g. f_BW, the mere presence of an amplitude of the whirling oscillation such as BW_amp, may be used for setting a whirling oscillation situation which needs to be controlled. For example, a control action which reduces the rotor speed f_hub=dϕ/dt may reduce the oscillation amplitude when the whirling oscillation is excited due to a convergence of a resonant whirling resonance and rotor frequency such as the 3P frequency.

The oscillation component 204, e.g. in the form of the amplitude FW_amp or BW_amp, may be compared with a predetermined threshold for determining the presence of a whirling oscillation which requires a control action using the determined oscillation component 204 as input.

Other resonant or non-resonant whirling oscillations may be excited by other structural oscillations of the wind turbine such as wind induced oscillations and other excitations associated with the rotation of the rotor 102. Such other oscillations may likewise be reduced by controlling the rotor speed, e.g. by reducing the rotor speed.

Thus, in general the control of the wind turbine may involve adjusting the rotor speed dependent on the blade oscillation component 204 in order to reduce the whirling oscillation amplitude.

The adjustment of the rotor speed may comprise adjusting the pitch angle and/or adjusting the torque or power reference for the generator of the wind turbine, e.g. in order to reduce the rotor speed. For example, the control signal y_ctrl may contain a power reference or power adjustment for the power converter or the control signal y_ctrl may contain a pitch reference or pitch adjustment for the pitch controller of the wind turbine.

Alternatively or additionally, the whirling oscillations may be reduced by controlling the pitch of the blades 103 independently of each other, i.e. based on individual pitch references for individual blades, where the pitch references are determined based on the phase signal FW_phase, BW_phase of the oscillation component 204 which contains information of the phase of the rotation-transformed oscillation signal 203. The phase signal of oscillation component 204 may include one or both of the forward and backward signals. Additionally, the determination of pitch references may include the amplitude signal FW_amp, BW_amp of one or both of the forward and backward signals. Thus, by use of the phase and optionally the amplitude signals the pitch of the blades can be controlled to counteract the blade whirling oscillations.

By performing individual pitching of the blades 103, it may be possible to damping whirling oscillations without reducing the rotation speed of the rotor 102.

The control signal y_ctrl for controlling the pitch angle or the torque or power reference for controlling the rotor speed, for controlling individual pitch angles, or for other control purposes such as shutting down the wind turbine may be determined by the controller 220 or other controller components of the wind turbine 100.

Optionally, the control system 250 may be configured with additional filter elements 213 such as band-pass filters arranged to filter the measurement signal 201, 202 based on the frequency of interest fi prior to performing the rotation transformation with transformation 211. For example, the band pass filter 213 may be arranged to filter the measurement signal 201 before the measurement signal 201 is transformed by rotation transformation 210. In this case the band pass filter 213 is configured to pass frequencies located near the frequency of interest fi. Alternatively, the band pass filter 213 may be arranged to filter the measurement signal 202 or the signal Fx, Fz previously rotation transformed by transformation 210. In this case, the frequency of interest fi is located at frequencies fi±f_hub in the non-rotating frame and, therefore, the band pass filter 213 may be configured to band pass filter one or both of the frequencies fi±f_hub. Possibly, the measurement signal 201, 202 may be filtered both before the rotation transformation 210 with the band pass filter 213 at fi and after the rotation transformation 210 with a further band pass filter at the frequencies fi±f_hub. Since other non-relevant or disturbing frequencies are removed, the filter function of the processing element 212 may be made simpler or the processing element 212 may be omitted.

Thus, the optional filter element 213 may be arranged to filter the measurement signal 201, 202, or a derivative therefrom (i.e. the rotation transformed signal Fx, Fz), into a band pass filtered signal component of the blade oscillation where the filtering is performed at a frequency of the blade oscillation defined relative to the measurement frame of the measurement signal, or the derivative therefrom, i.e. at the frequency fi or at frequencies fi±f_hub.

FIG. 3A illustrates an alternative embodiment of the method of FIG. 2A and the control system 250. The method of FIG. 3A is similarly based on rotation-transforming the measurement signal 201, 202, or a derivative therefrom, from the measurement frame into at least one target frame based on the frequency of interest fi to obtain a rotation-transformed signal 301. The rotation transformation is performed by rotation transformation element 311 where the rotation-transformation comprises a backward or forward rotation direction of the target frame relative to a rotor rotation direction. The at least one blade oscillation component 204 is generated from the rotation-transformed signal 301 based on filtering with a low pass filter 312.

In a first example, the measurement signal 201 is obtained in the rotor frame in the form of blade signals Mr1-Mr3 or hub signals Fhz, Fhz. In the rotor frame the oscillation of interest has the frequency of interest fi. The oscillation of interest either rotates in a forward or backward direction relative to the rotor rotation 120. The rotation transformation element 311 is based on the frequency of interest fi and is arranged to rotate the measurement frame or rotor frame to the non-rotating frame.

The rotation transformation element 311 may embody a rotation transformation Rhub2BW acting in a backward rotation direction BW relative to the rotor rotation direction to transform a backward whirling oscillation in the measurement frame to a zero-frequency in the target frame. The Rhub2BW transformation is a function of the angle θfi of the whirling oscillation obtained as described above.

Alternatively or additionally, the rotation transformation element 311 may embody a rotation transformation Rhub2FW acting in a forward rotation direction FW relative to the rotor rotation direction to transform a forward whirling oscillation in the measurement frame to a zero-frequency in the target frame. The Rhub2FW transformation is also function of the angle θfi of the whirling oscillation.

In case the measurement signal 201 comprises the blade signals Mr1-Mr3, the blade signals have to be projected by onto the hub coordinate system Xh, Zh as described above.

In case the measurement signal 202 comprises nacelle signals Fnx, Fnz, the nacelle signals need initially to be rotation transformed from the non-rotating frame to the rotor frame, e.g. by the rotation transformation element 211a, before being rotation transformed by rotation element 311.

FIG. 3B shows the spectra of the rotation transformed signal 301 from the rotation transformation element 311. The upper graph shows the effect of the Rhub2FW rotation transformation which transforms the forward whirling oscillation in the rotor frame to a zero-frequency or to a low-frequency range. With the Rhub2FW rotation transformation, a backward whirling oscillation in the rotor frame will be transformed to the frequency 2*fi, i.e. to a frequency being twice the frequency of interest. The high frequency component of the backward whirling oscillation is easily removed by use of low pass filter, alternatively by a notch filter, configured to leave the low frequency component of the forward whirling oscillation unaffected. The low pass or notch filter is implemented in filter component 312. Accordingly, by use of the Rhub2FW rotation transformation and the filter 312, the blade oscillation component 204, in the form of amplitude and/or phase, for the forward whirling oscillation can be determined.

Similarly, the lower graph shows the effect of the Rhub2BW rotation transformation which transforms the backward whirling oscillation in the rotor frame to a zero-frequency or to a low-frequency range. With the Rhub2BW rotation transformation, a forward whirling oscillation in the rotor frame will be transformed to the frequency 2*fi. The high frequency component of the forward whirling oscillation is removed by use of the same filter 312. Accordingly, by use of the Rhub2BW rotation transformation and the filter 312, the blade oscillation component 204, in the form of amplitude and/or phase, for the backward whirling oscillation can be determined.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for controlling a wind turbine comprising a rotor with two or more blades, the method comprising:
   obtaining a measurement signal indicative of a blade oscillation of at least one of the two or more blades, where the measurement signal is obtained in a measurement frame of the wind turbine;
   rotation-transforming the measurement signal, or a derivative of the measurement signal, from the measurement frame into at least one target frame based on a frequency of interest of the at least one of the two or more blades to obtain a rotation-transformed signal, where the at least one target frame rotates with the frequency of interest relative to a rotation frequency of the rotor, and where the rotation-transforming comprises a backward or forward rotation transformation direction relative to a rotor rotation direction;
   based on the rotation-transformed signal, obtaining at least one blade oscillation component of the blade oscillation acting in a backward or forward rotation direction relative to the rotor rotation direction; and
   controlling the wind turbine based on the at least one blade oscillation component.

2. The method of claim 1, where the at least one blade oscillation component comprises a forward blade oscillation component of the blade oscillation acting in a forward direction of the rotor rotation.

3. The method of claim 1, where the at least one blade oscillation component comprises a backward oscillation component of the blade oscillation acting in a backward direction of the rotor rotation.

4. The method of claim 1, comprising filtering the rotation-transformed signal for obtaining the at least one blade oscillation component.

5. The method of claim 1, comprising band-pass filtering the measurement signal based on the frequency of interest prior to the rotation-transforming of the measurement signal.

6. The method of claim 1, where the measurement frame is a rotor frame rotating with the rotor or where the measurement frame is a non-rotating frame.

7. The method of claim 1, where the frequency of interest is a resonance frequency of the at least one of the two or more blades.

8. The method of claim 1, further comprising rotation-transforming the measurement signal from the measurement frame into a measurement signal in a non-rotating frame based on an angular position of the rotor.

9. The method of claim 1, further comprising band-pass filtering the measurement signal obtained in a non-rotating frame, or the measurement signal transformed into the non-rotating frame, based on a frequency of the blade oscillation in the non-rotating frame determined based on the frequency of interest and the rotation frequency of the rotor.

10. The method of claim 9, further comprising rotation-transforming the band-pass filtered measurement signal in the non-rotating frame from the non-rotating frame to the rotor frame to obtain a signal of the blade oscillation at the frequency of interest.

11. The method of claim 1, wherein the controlling of the wind turbine comprises adjusting the rotation frequency of the rotor dependent on the at least one blade oscillation component.

12. The method of claim 1, wherein the controlling of the wind turbine is based on an amplitude and/or phase of the at least one blade oscillation component.

13. A control system for controlling a wind turbine comprising a rotor with two or more blades, where the control system is arranged to perform an operation for controlling the wind turbine, comprising:
 obtaining a measurement signal indicative of a blade oscillation of at least one of the two or more blades, where the measurement signal is obtained in a measurement frame of the wind turbine;
 rotation-transforming the measurement signal, or a derivative of the measurement signal, from the measurement frame into at least one target frame based on a frequency of interest of the at least one blade of the two or more blades to obtain a rotation-transformed signal, where the at least one target frame rotates with the frequency of interest relative to a rotation frequency of the rotor, and where the rotation-transforming comprises a backward or forward rotation transformation direction relative to a rotor rotation direction;
 based on the rotation-transformed signal, obtaining at least one blade oscillation component of the blade oscillation acting in the backward or forward rotation direction relative to the rotor rotation direction; and
 controlling the wind turbine based on the at least one blade oscillation component.

14. A wind turbine, comprising:
 a tower;
 a nacelle disposed on the tower;
 a rotor having a plurality of blades and the rotor extending from the nacelle;
 a control system configured to perform an operation, comprising:
  obtaining a measurement signal indicative of a blade oscillation of at least one of the plurality blades, where the measurement signal is obtained in a measurement frame of the wind turbine;
  rotation-transforming the measurement signal, or a derivative of the measurement signal, from the measurement frame into at least one target frame based on a frequency of interest of the at least one of the plurality of blades to obtain a rotation-transformed signal, where the at least one target frame rotates with the frequency of interest relative to a rotation frequency of the rotor, and where the rotation-transformation comprises a backward or forward rotation transformation direction relative to a rotor rotation direction;
  based on the rotation-transformed signal, obtaining at least one blade oscillation component of the blade oscillation acting in the backward or forward rotation direction relative to the rotor rotation direction; and
  controlling the wind turbine based on the blade oscillation component.

* * * * *